US008750789B2

United States Patent
Baldemair et al.

(10) Patent No.: US 8,750,789 B2
(45) Date of Patent: Jun. 10, 2014

(54) SYSTEMS AND METHODS FOR FORWARDING A MULTI-USER RF SIGNAL

(75) Inventors: Robert Baldemair, Solna (SE); Päl Frenger, Linköping (SE); Niklas Johansson, Sollentuna (SE); Peter Larsson, Solna (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 442 days.

(21) Appl. No.: 13/143,522

(22) PCT Filed: Jan. 19, 2009

(86) PCT No.: PCT/SE2009/050046
§ 371 (c)(1),
(2), (4) Date: Jul. 6, 2011

(87) PCT Pub. No.: WO2010/082883
PCT Pub. Date: Jul. 22, 2010

(65) Prior Publication Data
US 2011/0275313 A1 Nov. 10, 2011

(51) Int. Cl.
*H04W 88/04* (2009.01)
*H04B 7/15* (2006.01)

(52) U.S. Cl.
USPC .............. 455/11.1; 455/16; 455/23; 455/24

(58) Field of Classification Search
USPC ............ 455/7, 11.1, 16, 17, 22, 24, 20, 13.3, 455/23, 452.1, 42, 60; 370/216
See application file for complete search history.

(56) References Cited

U.S. PATENT DOCUMENTS

| | | | |
|---|---|---|---|
| 2002/0028655 A1* | 3/2002 | Rosener et al. | 455/16 |
| 2007/0098102 A1* | 5/2007 | Hottinen | 375/260 |
| 2008/0274692 A1* | 11/2008 | Larsson | 455/24 |
| 2013/0135988 A1* | 5/2013 | Kim et al. | 370/216 |

FOREIGN PATENT DOCUMENTS

EP 1 750 403 A 2/2007

OTHER PUBLICATIONS

Riihonen T et al: "Analysis of subcarrier pairing II) a cellular OFDMA relay link" Smart Antennas, 2008. WSA 2008. International ITG Workshop on, IEEE, Piscataway, NJ, USA, Feb. 26, 2008, pp. 104-111, XP031238965 ISBN: 978-1-4244-1756-6 abstract paragraph [0002] paragraph [02.1] figure 1.

Hottinen A et al: "Subchannel assignment in OFDM relay nodes" Proceedings of the Annual. Conference on Information Sciences. Andsystems, XX, XX, Mar. 1, 2008. pages 1314-1317, XP003011320 abstract paragraph [OOII] figure 1.

* cited by examiner

*Primary Examiner* — John J Lee

(57) ABSTRACT

A dynamic frequency translating repeater operating in a mobile communications system is operable to receive a multi-user signal and perform time-varying and user-specific frequency shifting in the repeater signal. The dynamic frequency translating repeater may further perform user subcarrier specific dynamic frequency translation. Different mobile stations may be allocated different frequency shift amounts based on the interference environments, resource allocations, and scheduling constraints particular to each mobile station.

31 Claims, 8 Drawing Sheets

SYSTEMS AND METHODS FOR FORWARDING A MULTI-USER RF SIGNAL

TECHNICAL FIELD

The present invention relates to systems and methods for forwarding a communication signal. An aspect of the present invention pertains to repeaters or relays in mobile communications systems.

BACKGROUND

Using a repeater or relay (hereafter "repeater" for convenience) is a cost-effective way to increase coverage in a mobile communications system. A repeater extends the coverage of a base station, that is, the size of a cell, by retransmitting the signal received from the base station. However, present technology repeaters do not fully deliver, to cell edges, on the promise of increased data rates and capacities available in systems such as Long Term Evolution (LTE) Advanced because of issues such as self-interference and inefficient bandwidth utilization.

Layer 1 repeaters do not decode signals but perform an amplify-and-forward operation. Some layer 1 repeaters may perform other simple low layer functions such as filtering and beamforming. These repeaters only have layer 1 (i.e., physical layer) functionality.

One drawback of prior art repeaters is self-interference. Self-interference can occur with On-Frequency Repeaters (OFR) and with other repeater nodes. Self-interference occurs because the transmit and receive antennas are insufficiently isolated. Thus, some part of the output signal is received at the input. To avoid self-interference, self-interference cancellation techniques can be used. However, in high gain repeaters, the achievable antenna isolation may nevertheless not be sufficient. Multiple repeaters may also interfere with each other. That is, the signal forwarded by one repeater node may be received and amplified by another repeater node where it is seen as interference.

Some of these drawbacks may be mitigated by using static Frequency Translating Repeaters (FTR). An FTR may receive a WCDMA input signal on one radio channel, for example, shift the signal in the frequency domain by a fixed amount to another radio channel, and transmit the shifted WCDMA signal. Such prior art repeaters do not distinguish between different users in a multi-user signal (in the downlink, a multi-user signal is transmitted from a single source and represents different users' data, whereas in the uplink, a multi-user signal is the superposition of multiple users' signals received from multiple sources). The amount of frequency shift or offset is configurable, but static. That is, the frequency shift amount is not changed while the FTR is repeating.

The LTE specification and its successors such as LTE-Advanced use Frequency Division Multiplexing (FDM) and Frequency Division Multiple Access (FDMA) to package multiple users' data in the downlink and uplink, respectively. This is in contrast to, for example, WCDMA, where code division is used to handle multiple users. More specifically, in the downlink of LTE and LTE-Advanced, Orthogonal Frequency Division Multiplexing (OFDM) is deployed whereas, in the uplink, Discrete Fourier Transform Spread-OFDM (DFTS-OFDM, a precoded version of OFDM) is applied. In OFDM, spectrum is partitioned into many narrowband subcarriers and 12 consecutive subcarriers are grouped into a basic scheduling unit called a Resource Block (RB). One user can be scheduled on one or multiple RBs, which may be consecutive or not.

Prior art FTRs treat an incoming multi-user signal as a single signal entity and do not differentiate between different users. This means that signals belonging to different users are shifted equally in frequency, which leads to sub-optimal resource usage since different users experience different interference and would benefit from being served at different frequencies. Furthermore, the frequency shift amount in prior art repeaters is a static parameter which is not changed during operation. Since interference as well as scheduling and user allocation are dynamic processes that vary, for example, with traffic demand, mobility, and channel changes, static FTRs perform only sub-optimally.

The problem with different time and spatially varying interference situations for users exploiting a repeater with a static frequency translation is illustrated in FIG. 1. In FIG. 1, a base station 100 transmits a multi-user signal 110 which packages signals for users MS1 and MS2 at adjacent frequencies $f_1$ and $f_2$, respectively, as shown in base station resource allocation 120. Static Frequency Translating Repeater 150 receives multi-user signal 110, does not unpackage any user's signals, and simply shifts packaged multi-user signal 110 in frequency to multi-user signal 160—which comprises the packaged signals for users MS1 and MS2 at adjacent frequencies, albeit at frequencies $f_3$ and $f_4$, respectively, as shown in FTR resource allocation 170. At $time_d$, MS1's receiver experiences interference ("H") on frequencies $f_2$ and $f_4$ and no interference ("L") on frequencies $f_1$ and $f_3$ as illustrated in reference 181-0. Reference 182-0 indicates that MS2's receiver experiences interference only at frequency $f_4$ at $time_d$. However, because MS2 is allocated frequency $f_4$, MS2 experiences signal loss at least at $time_0$. At $time_1$, the interference environments change for MS1 and MS2 as shown in references 181-1 and 182-1 and neither user experiences signal loss at their allocated frequencies. Because prior art FTR 150 is unable to separate the users' signals and dynamically allocate frequencies on a user-by-user basis and unable to dynamically select a frequency shift amount, FTR 150 cannot redirect MS2's signal to a low-interference frequency to avoid the high-interference at frequency $f_4$.

Static FTRs also lead to inefficient bandwidth utilization in mobile communications systems employing frequency hopping. Typically, in a frequency hopping system, it is desirable that the input and output spectra of the FTR do not overlap. Thus, with prior art repeaters, the hopping pattern can at the most extend over half the available system bandwidth since the other half is needed for the translated signal. This limits both resource usage as well as frequency hopping gain since the maximum hop distance is limited.

Thus, it is desirable to have a frequency translating repeater which overcomes at least some of the aforementioned disadvantages.

SUMMARY

In one aspect, the present invention provides a frequency translating repeater. In some embodiments, the frequency translating repeater includes: a receiver operable to receive a multi-user signal comprising a first user signal occupying a first spectrum and a second user signal occupying a second spectrum; a first frequency shifter dynamically configurable to frequency shift the first spectrum by a first amount to produce a shifted first user signal; a second frequency shifter dynamically configurable to frequency shift the second spectrum by a second amount to produce a shifted second user signal, wherein the first amount is not equal to the second amount; a signal combiner configured to form a repeater signal comprising the shifted first user signal and the shifted second user signal; and a transmitter operable to transmit the repeater signal (in some embodiments, the spectrum of the repeater signal may overlap with the spectrum of the multi-user signal).

In some embodiments, the repeater is operable to receive from a base station, user equipment, or another node information specifying the first amount and the second amount. In some embodiments, the frequency translating repeater is further operable to: frequency shift a first portion of the first spectrum by a third amount to produce a first shifted first user signal; frequency shift a second portion of the first spectrum by a fourth amount to produce a second shifted first user signal; and form a repeater signal comprising the first and second shifted first user signals.

In some embodiments, the repeater further comprises: (i) a plurality of filters for filtering the multi-user signal to produce a corresponding plurality of signals; and (ii) a plurality of modulators for modulating at least one of the corresponding plurality of signals with a complex exponential function of a different frequency.

In some embodiments, the repeater further includes a band pass filter for isolating the first user signal from the multi-user signal. A scaling factor may be associated with the band pass filter and the scaling factor may specify a power level for the transmission of the first user signal in the repeater signal.

In some embodiments, the first frequency shifter is further configurable to frequency shift the first spectrum by the first amount at a first time to produce a shifted first user signal at the first time and to frequency shift the first spectrum by a third amount at a second time to produce a shifted first user signal at the second time, wherein the third amount is different than the first amount.

In some embodiments, the repeater is configured to be controlled by a base station. For example, in some embodiments, the repeater is configured to receive from the base station a control message setting the first amount and the second amount.

In another aspect, the present invention provides a method performed by a repeater in a mobile radio system. In some embodiments, the method includes the following steps: (a) receiving, at the repeater, a multi-user signal comprising a first user signal having a spectrum and a second user signal having a spectrum; (b) frequency shifting at least a portion of the spectrum of the first user signal by a first amount to produce a shifted first user signal; (c) frequency shifting the spectrum of the second user signal by a second amount that is different than the first amount to produce a shifted second user signal; (d) forming a repeater signal comprising the shifted first user signal and the shifted second user signal; and (d) transmitting the repeater signal (in some embodiments, the spectrum of the repeater signal may overlap with the spectrum of the multi-user signal). In some embodiments, the method may also include receiving, from a base station or mobile terminal, information specifying the first amount and the second amount.

In some embodiments, the step of frequency shifting the spectrum of the first user signal includes: frequency shifting a first portion of the spectrum of the first user signal by the first amount to produce a first shifted first user signal; and frequency shifting a second portion of the spectrum of the first user signal by a third amount to produce a second shifted first user signal, wherein the third amount does not equal the first amount.

In some embodiments, the first user signal is isolated from the multi-user signal by filtering the multi-user signal using a band pass filter. In these embodiments, a scaling factor may be associated with the band pass filter. The scaling factor may specify a power level for the transmission of the first user signal in the repeater signal.

In other embodiments, the method further includes the steps of: using a plurality of filters to filter the multi-user signal to produce a corresponding plurality of signals; and using a plurality of modulators to modulate each of the corresponding plurality of signals with a complex exponential function of a different frequency.

The method may also include the step of frequency shifting at least a portion of the spectrum of the first user signal by a third amount to produce a shifted first user signal at some point in time after frequency shifting at least a portion of the spectrum of the first user signal by the first amount, wherein the third amount is different than the first amount.

The above and other aspects and embodiments are described below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

DETAILED DESCRIPTION

Figure 1:
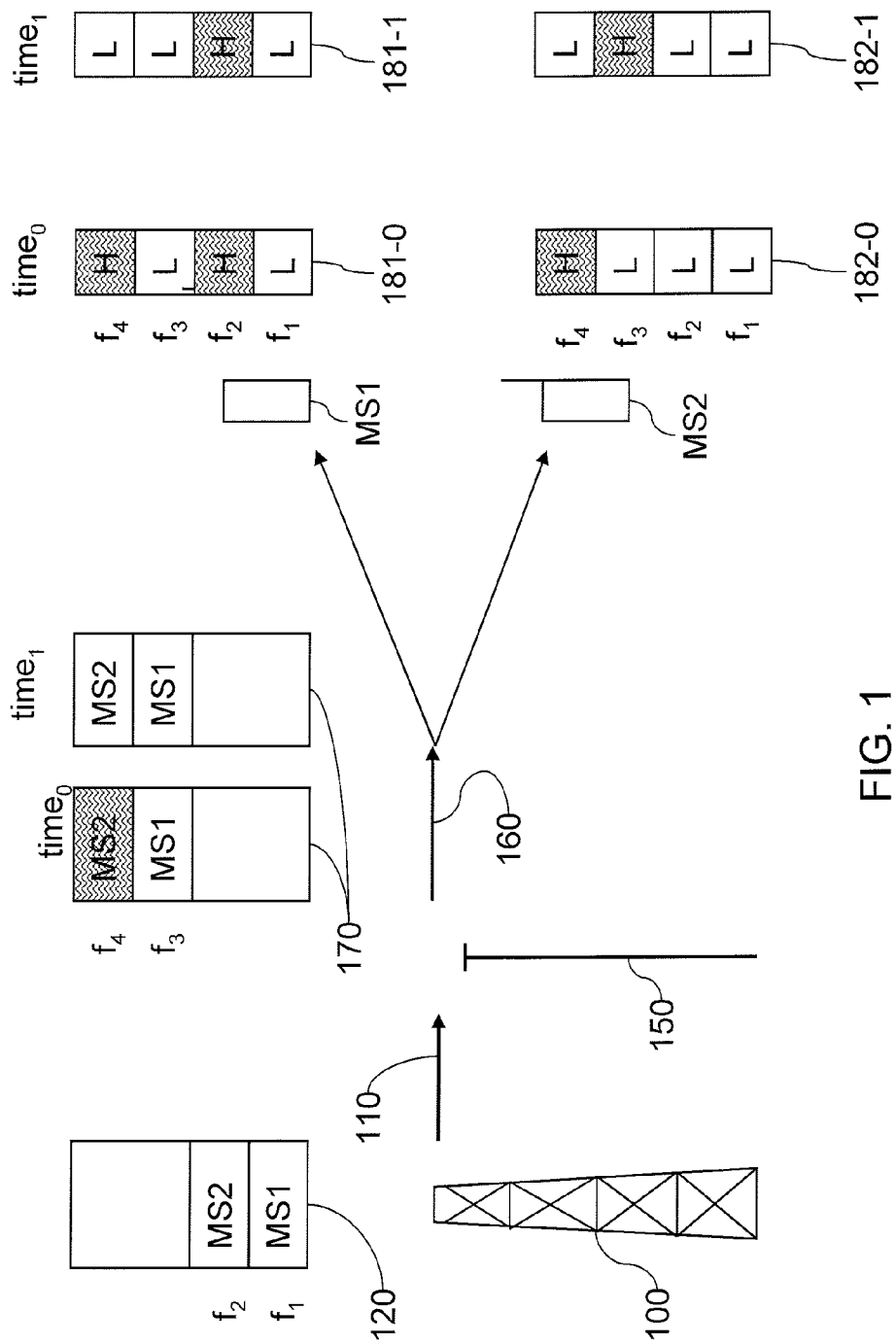
FIG. 1 illustrates prior art frequency translating repeating, fixed frequency shifting, and user interference environments.
Figure 2:
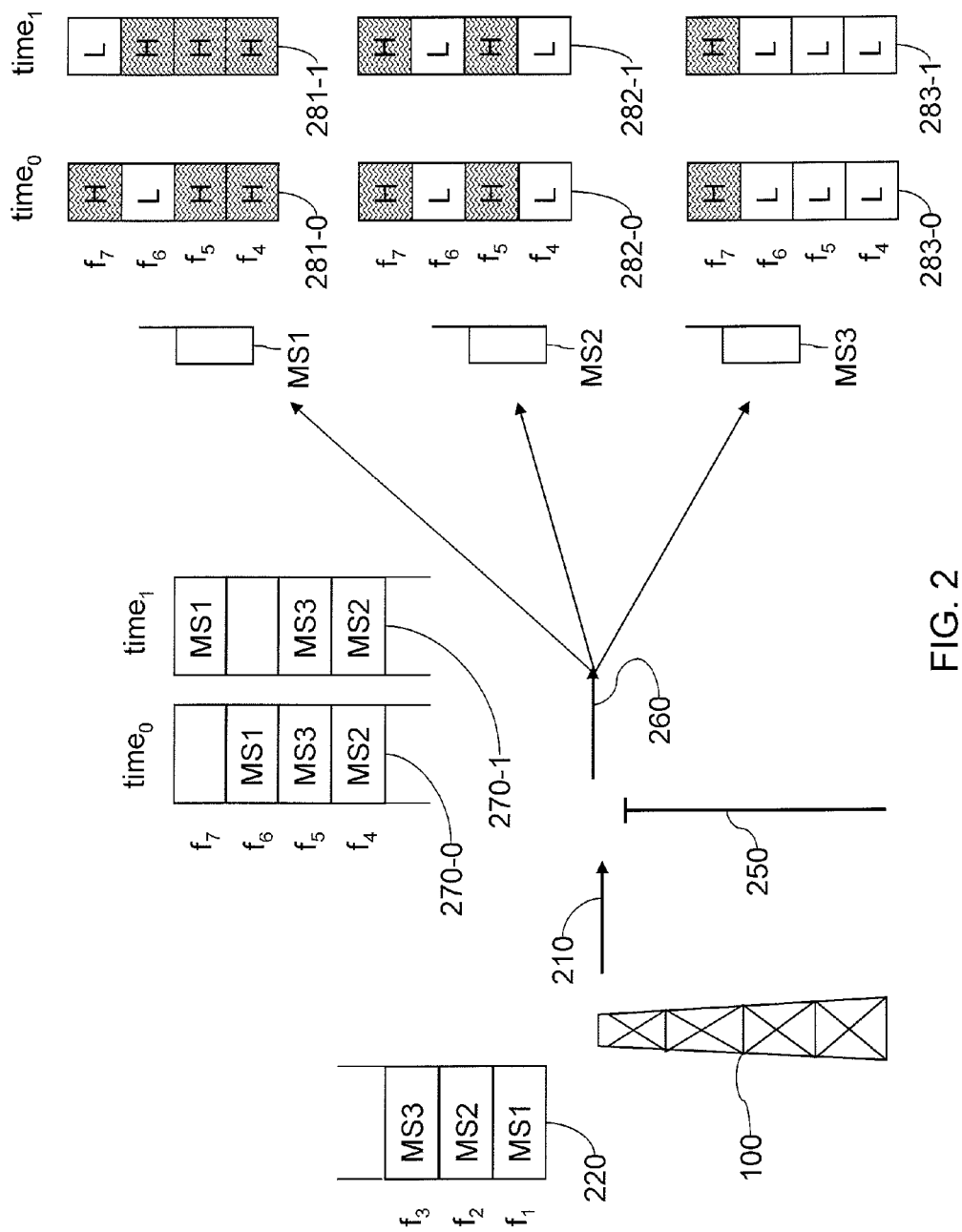
FIG. 2 illustrates aspects of a dynamic frequency translating repeater according to some embodiments of the invention.

In one embodiment of the present invention, as illustrated in FIG. 2, a dynamic frequency shifting repeater 250 may retransmit a multi-user downlink signal 210 as repeater signal 260 to spatially disparate mobile stations MS1, MS2, and MS3. These mobile stations may experience different interference levels at different times as shown in references 281-0, 281-1, 282-0, 282-1, 283-0, 283-1. Base station 100 transmits multi-user signal 210 which comprises signals for mobile stations MS1, MS2, and MS3 carried on adjacent frequencies $f_1$, $f_2$, and $f_3$, respectively and as illustrated in base station resource allocation 220. Repeater 250 is operable to retransmit multi-user signal 210 as repeater signal 260, which, as illustrated in repeater resource allocations 270-0 and 270-1, may comprise the users' signals shifted by different amounts at a given time and by different amounts at different times. In this illustration, signals for mobile stations MS2 and MS3 are each shifted up two frequency blocks from $f_2$ to $f_4$ and $f_3$ to $f_5$, respectively, at both $time_0$ and $time_1$. The signal for mobile station MS1, on the other hand, is shifted up five frequency blocks at $time_0$ from $f_1$ to $f_6$ and six frequency blocks at $time_1$ from $f_1$ to $f_7$. In this way, MS1 may receive its associated signals despite its experiencing time-varying levels of interference at the various frequencies.

Figure 3:
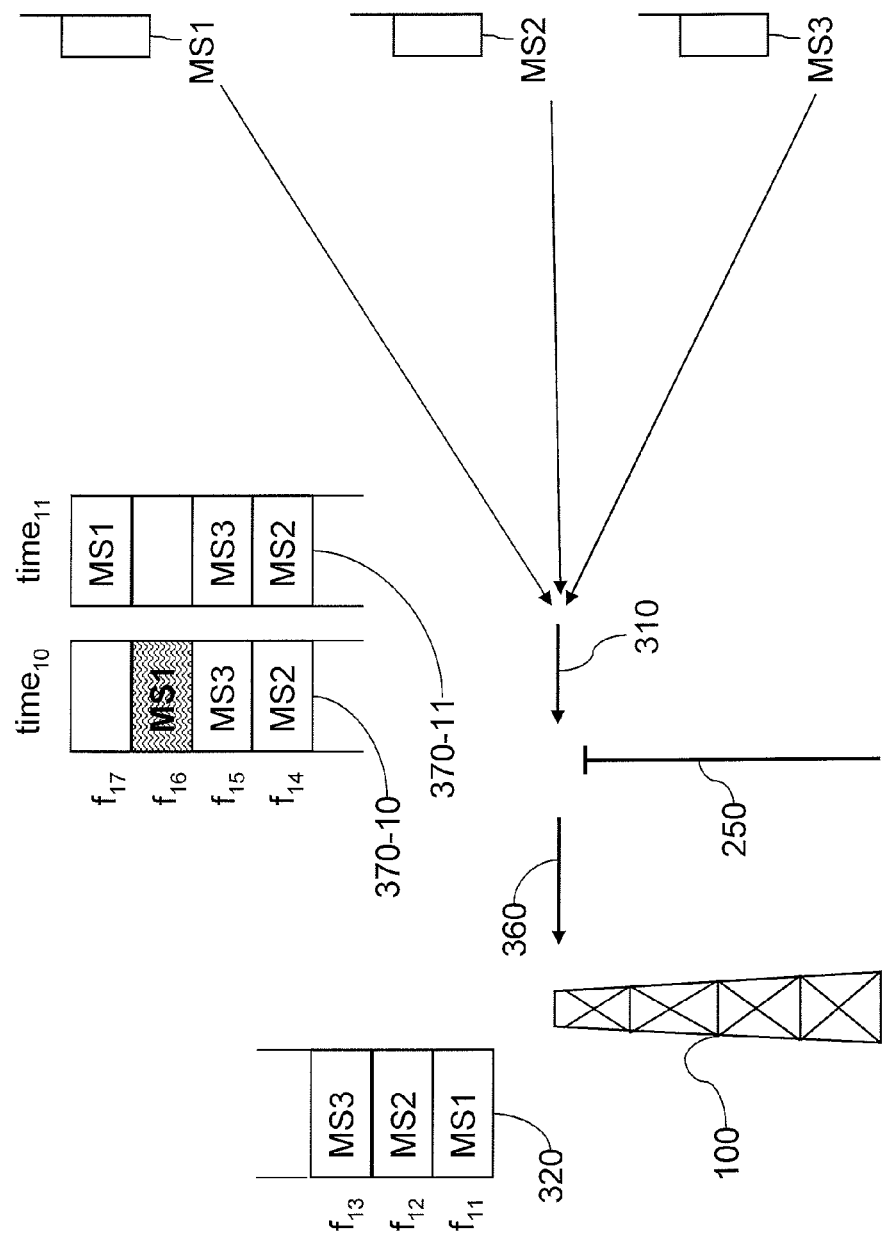
FIG. 3 illustrates aspects of a dynamic frequency translating repeater according to some embodiments of the invention.

In one embodiment of the present invention, as illustrated in FIG. 3, a dynamic frequency shifting repeater 250 may retransmit a multi-user uplink signal 310 as repeater signal 360 to base station 100. Multi-user uplink signal 310 may be a superposition of signals from mobile stations MS1, MS2, and MS3. The repeater may experience different mobile signal to interference levels at different times as shown in references 370-10 and 370-11. At a first time, $time_{10}$, mobile stations MS1, MS2, and MS3 transmit uplink signals on frequencies $f_{16}$, $f_{14}$, and $f_{15}$, respectively and as illustrated in repeater resource allocation 370-10. At $time_{10}$, repeater 250 experiences a high mobile signal to interference level for mobile station MS1 on frequency $f_{16}$. At a second time, $time_{11}$, mobile stations MS1, MS2, and MS3 transmit uplink signals on frequencies $f_{17}$, $f_{14}$, and $f_{15}$, respectively and as illustrated in repeater resource allocation 370-11. Repeater 250 is operable to retransmit multi-user signal 310 as repeater signal 360, which, as illustrated in base station resource allocation 320, may comprise the users' signals shifted by different amounts at a given time and by different amounts at different times. In this illustration, the signal for mobile station MS1 is down-shifted in signal 310 from $f_{16}$ and $f_{17}$ at times $time_{10}$ and $time_{11}$, respectively, to $f_{11}$ in signal 360—shifts of five frequency bands at one time and six bands at another time. The signals for MS2 and MS3 are down-shifted not by five or six bands, but only by two bands at both times $time_{10}$ and $time_{11}$ so that MS2's signal is packaged in signal 360 at frequency $f_{12}$ and MS3's signal is packaged in signal 360 at frequency $f_{13}$. In this manner, the mobile stations' uplink signals may be transmitted on frequencies which are dynamically selected in view of, for example, mobile signal to interference levels experienced by the repeater at the various uplink frequencies.

Figure 4:
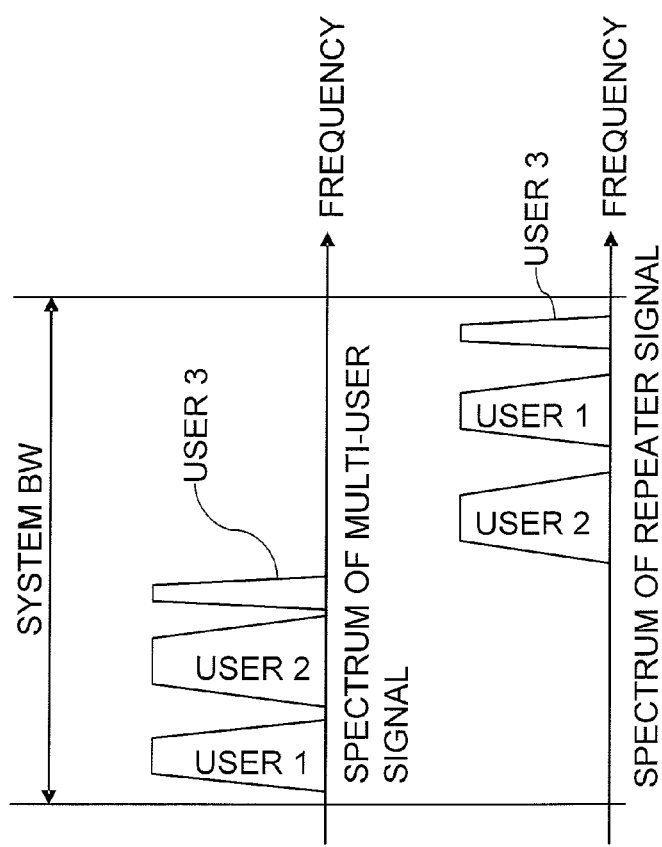
FIG. 4 illustrates multiple users' resource allocations in a dynamic frequency translating repeater system according to some embodiments of the invention.

Shifting of different user signal spectra by different amounts is illustrated in FIG. 4 in accordance with an aspect of the invention, in which multiple users are scheduled simultaneously. In FIG. 4, repeater 250 shifts the spectrum associated with USER 1 a first amount, the first amount being a significant portion of the system bandwidth. Repeater 250 shifts the spectrum associated with USER 3 by a different amount—about half of the system bandwidth. And the spectrum associated with USER 2 is shifted by a yet smaller amount. In accordance with some embodiments of the invention, repeater 250 may change these amounts dynamically. Thus, FIG. 4 may illustrate only a single time instance. At another time, the amount of the frequency shifts may be different.

Figure 5:
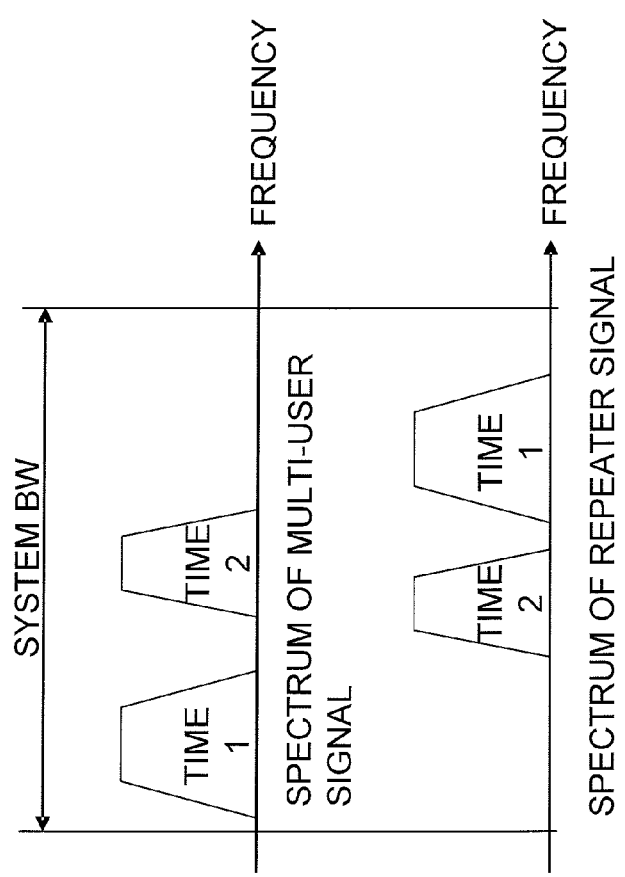
FIG. 5 illustrates a user's dynamic resource allocation in a frequency translating repeater system according to some embodiments of the invention.

FIG. 5 illustrates possible spectra of a downlink signal received by a repeater at different times. At both times only a single user's spectra is illustrated. As illustrated in FIG. 5, it can be seen that a user's portion of the downlink spectrum may vary in both size and frequency from one time to a later time. A repeater operating in accordance with an embodiment of the invention (e.g., repeater 250) may shift these spectra by differing amounts at the different times. As can be seen in FIG. 5, the repeater shifts the user's signal spectrum up at time 1 (a positive shift amount) and down at time 2 (a negative shift amount).

In other embodiments, the bandwidth allocated to a single user may be split and the constituent parts of this signal may be translated by different amounts. Such increased flexibility enables more efficient resource usage A typical frequency translator has a baseband modulator. In the simplest case implemented in the continuous time domain, no frequency selective processing is done and the whole baseband is shifted in the frequency domain by multiplying with a complex exponential function. In a frequency translation operation performed in the discrete time domain, the result of multiplying with a discrete exponential function is actually a cyclic frequency shift, where, as long as the sampling rate is sufficient, the discrete time domain implementation will, after reconstruction, be equivalent to the corresponding continuous time domain implementation. According to an aspect of the present invention, the applied frequency shift may change dynamically from time-slot to time-slot. In an exemplary setting, such as LTE, a time-slot is either the duration of a resource block or a subframe.

Typically the system bandwidth is smaller than the chip rate and the frequency of the modulator must therefore be chosen so that the allocated spectrum after modulation is still within the system bandwidth.

Figure 6:
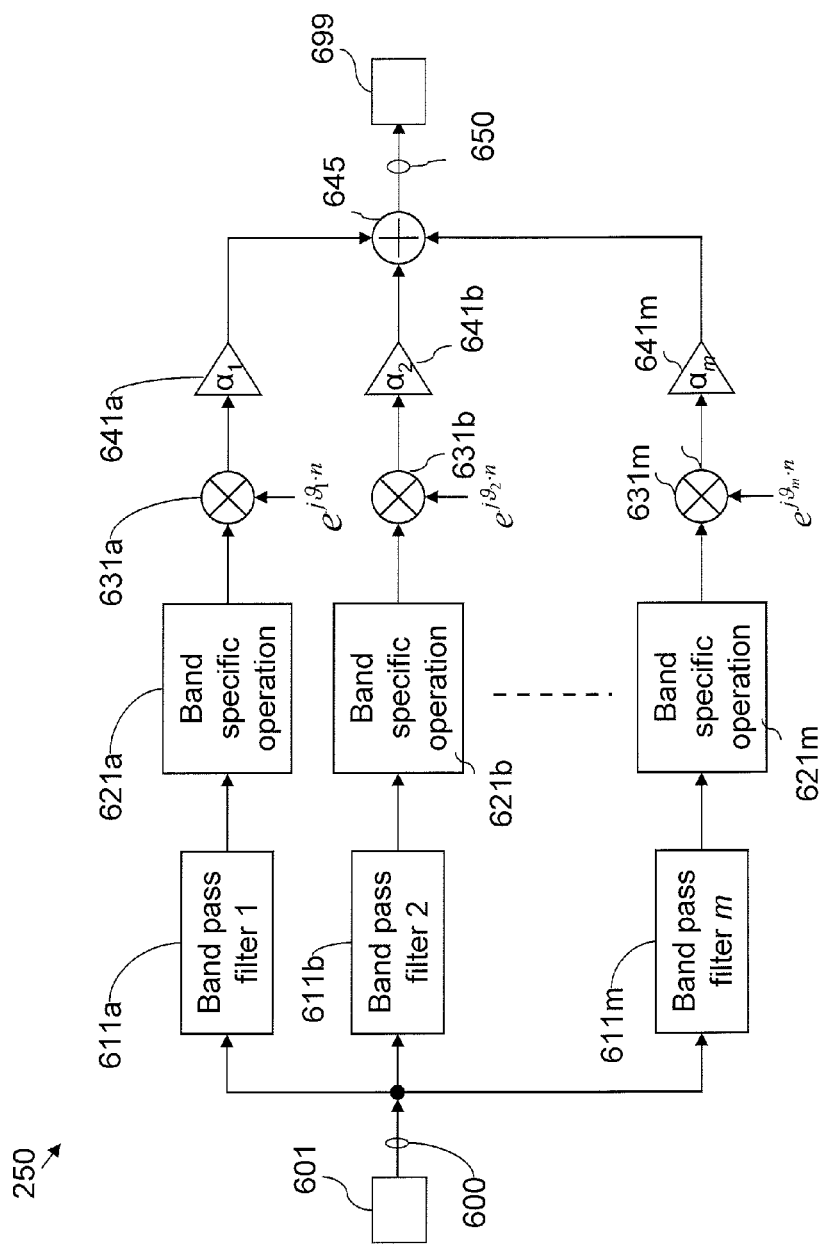
FIG. 6 is a functional block diagram illustrating a dynamic frequency translating repeater according to some embodiments of the invention.

Referring now to FIG. 6, FIG. 6 is a functional block diagram of a portion of repeater 250 according to an embodiment of the invention. As illustrated in FIG. 6, a multi-user signal 600 is received by receiver 601 and delivered to a bank of m band pass filter branches. Each branch of the filter bank may include components such as a band pass filter 611, a band specific function module 621, a complex modulator 631, and a scaler 641. For example, the first branch includes band pass filter 611a, band specific function module 621a, complex modulator 631a, and scaler 641a; the second branch includes band pass filter 611b, band specific function module 621b, complex modulator 631b, and scaler 641b; and the mth branch includes band pass filter 611m, band specific function module 621m, complex modulator 631m, and scaler 641m.

The output of the branches may be combined by a combiner 645 to form a repeater signal and the repeater signal is provided to a transmitter 699 configured to transmit the repeater signal. Each band pass filter 611 may be configured to pass a portion of the multi-user signal 600 spectrum. In one embodiment, band pass filters 611 may each output a single user signal, a set of user signals, or only a sub band of a user signal. A signal output by band pass filters may then be modulated with a complex exponential function of a different frequency. With the individual complex modulators, each branch signal can be treated independently. A scaling factor for each branch enables sub band specific power control. In the above manner, repeater 250 is able to achieve the results shown in FIGS. 4 and 5. That is, in this manner, repeater 250 can: (1) receive a multi-user signal comprising a first user signal occupying a first spectrum and a second user signal occupying a second spectrum; (2) frequency shift the first spectrum by a first amount to produce a shifted first user signal; (3) frequency shift the second spectrum by a second amount that is different than the first amount to produce a shifted second user signal; (4) form a repeater signal comprising the shifted first user signal and the shifted second user signal; and (5) transmit the repeater signal.

Special cases may occur, for example, where a scaling factor is equal to zero. This is equivalent to not having the branch or the branch filter being zero. In this case, the signal corresponding to this sub band is not repeated. Another special case may occur where the frequency shift applied to certain filtered sub band signal is zero. In this case, the sub band signal is repeated, but not shifted in frequency.

The frequency granularity is determined by the length of the cyclic prefix applied in the underlying OFDM or DFT-S-OFDMA modulation scheme and how much of the cyclic prefix may be consumed by the filtering process. For example, in an LTE system operating at 20 MHz bandwidth, a cyclic prefix contains 144 chips. Thus, in an embodiment compatible with such a system, filters consuming 64 chips may partition the system bandwidth into 8 to 16 sub bands and provide adequate stop band attenuation (that is, cross sub band insulation). Another embodiment having greater frequency granularity may have lesser stop band attenuation. For example, FIR filters with 64 taps and operating at $\frac{1}{8}$ or $\frac{1}{16}$ system bandwidth may have stop frequencies of $\frac{18}{16}$ MHz or $\frac{18}{32}$ MHz, respectively.

Each branch may furthermore contain a down-sampling unit after band pass filtering that converts the band pass filtered signal to a lower sampling rate which is still sufficient to represent the down-sampled signal (not shown in FIG. 6). The amount of down-sampling depends on bandwidth of the band pass filter and may thus vary among the branches.

An embodiment implementing the invention may permit frequency granularities larger than these values, in particular when the band pass filters have different bandwidths in the different branches. Moreover, an embodiment of the invention permits the number of branches, the filter function in each branch, the band specific operation, and the amplification in each branch, in addition to the applied modulator frequency in each branch, to be changed dynamically for each time-slot.

In mobile communications systems, the number of users as well as bandwidth and location of scheduled resources varies from time-slot to time-slot. In an embodiment of the invention, the number of branches as well as the processing done within each branch is dynamically adapted to the current scheduling situation.

In an embodiment that is compatible with a random access scheme, for example, random access in an LTE system, the random access occupies a certain frequency band in some subframes. Therefore, during subframes that contain random access resources, a branch is adapted to process received random access signals. In other subframes, this branch is not present or modified to process other signals.

Band pass filters in accordance with certain embodiments of the invention may be implemented using a variety of algorithms. For example, time domain filters may be used. Additionally, filtering may be performed in the frequency domain by using, for example, the overlap-and-add algorithm.

Where delays of more than one OFDM symbol are permitted, another embodiment may be used. In such embodiments, an FFT, in which the FFT frequency bins are spaced by the subcarrier bandwidth and the FFT input rate is equal to the chip rate of the received signal, may be used to transform the received signal into the frequency domain. In an exemplary 20 MHz LTE system, the chip rate may be 30.72 MHz. This may require time-synchronization so that a complete OFDM symbol is within the FFT window. The repeater may need to remove the cyclic prefix prior to the FFT window. This permits frequency translation to be done on a per subcarrier basis if desired. An IFFT of the same size as the FFT may be used to transform the signal back into the time-domain. In the time-domain, a new cyclic prefix may be created and transmitted after the IFFT operation. This operation of this embodiment may be considered as being performed blockwise. In this embodiment, it is assumed that the desired frequency shifts are integer multiples of a subcarrier bandwidth. Other embodiments, such as the filterbank approach illustrated in FIG. 6 are not based on this assumption.

In one embodiment, when a sub band is shifted from one frequency to another, a frequency shift transient may occur and cause spectrum widening and out-of-band radiation. In such a situation, it is possible to take a precaution such as windowing or filtering the frequency-shifted sub bands after the digital mixer. Another approach is to duplicate the sub band to the desired frequency band and then ramp up and down the gains at the new and the old frequency at the same time with, for example, a smooth time window function. This will allow a controlled overlap at the new and old frequencies.

Figure 7:
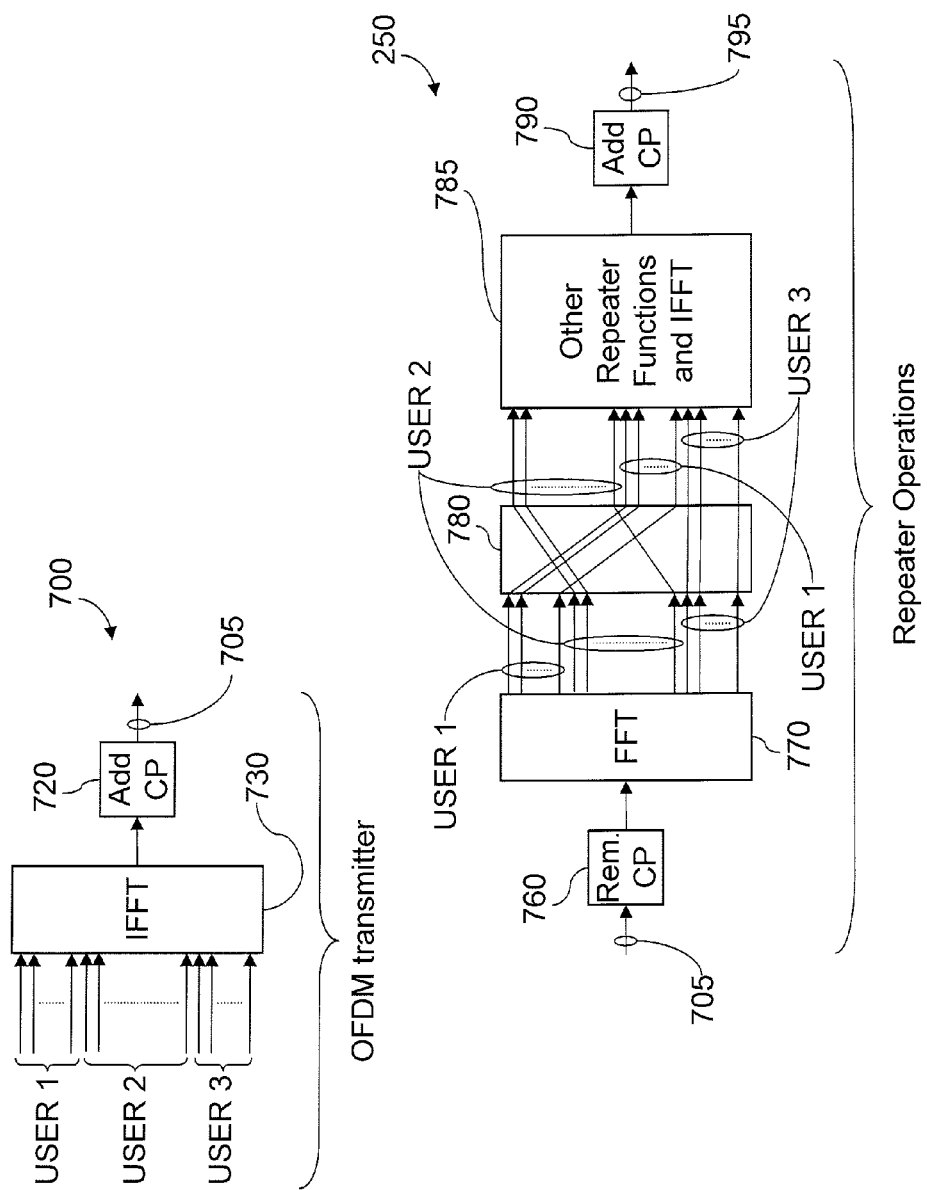
FIG. 7 is a functional block diagram illustrating a dynamic frequency translating repeater according to some embodiments of the invention.

FIG. 7 illustrates an exemplary embodiment of the invention where the downlink scheme is OFDM. As shown in FIG. 7, a base station may include an OFDM transmitter 700 including an IFFT 730 for combining multiple subcarrier signals of multiple users including those of USER 1, USER 2, and USER 3. A cyclic prefix insertion unit 720 adds a cyclical prefix (CP) to the combined signals to produce downlink signal 705. In this embodiment, repeater 250 includes a receiver (not shown) for receiving downlink signal 705 and a cyclic prefix removal unit 760 for removing cyclical prefix CP. The resultant signal is then fed to FFT 770 for separating the constituent subcarrier signals. Frequency shifter bank 780 then performs frequency shifting on the constituent subcarrier signals as described herein. The frequency shift may be the same for all subcarriers allocated to one user (as shown in FIG. 7) or may vary among the subcarriers. The shifted constituent signals are then fed to IFFT 785 for recombination. In some embodiments, other repeater functions, for example, amplification and multiple antennae beamforming may be performed in combination with IFFT 785. In other embodiments, other repeater functions may occur at different points in the repeater operations. The output of IFFT 785 is then fed to cyclic prefix insertion unit 790 where the cyclic prefix CP is added. Repeater signal 795 may then be transmitted by a transmitter (not shown) to the users' terminals.

In some embodiments of the invention, the repeater operation is controlled by a node remote from the repeater. In most cases this node will be a base station. However, in cases where, for example, the scheduling intelligence for uplink traffic resides within a terminal or mobile station, even the terminal or mobile station may control the repeater.

Figure 8:
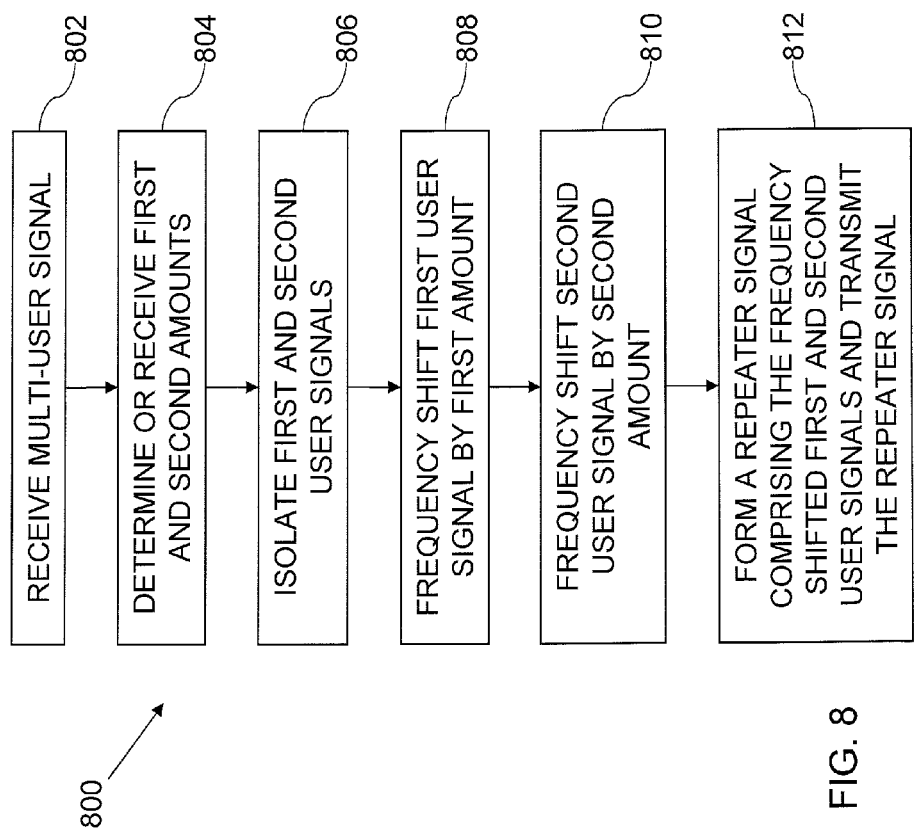
FIG. 8 is a flow chart illustrating a process according to some embodiments of the invention.

FIG. 8 is a flow chart illustrating a process 800, according to some embodiments of the invention, that is performed by repeater 250. Process 800 may begin in step 802, where repeater 250 receives a multi-user signal. In step 804, repeater determines or receives shift amounts. Base station 100, in some embodiments, may be operable to determine a shift amount for a given user based on interference information provided by the user's mobile station in the mobile communication system's service information channel and transmit the shift amount to repeater 250. In other embodiments, shift amount information may be provided to repeater 250 by, for example, a mobile terminal. In step 806, repeater 250 isolates one or more user signals from the multi-user signal by, for example, filtering the multi-user signal as described herein. For simplicity, we shall assume that in step 806, the repeater isolated from the multi-user signal a first user signal and a second user signal. In step 808, repeater 250 frequency shifts at least a portion of the spectrum of the first user signal by a shift amount (e.g., a shift amount determined/received in step 804) to produce a shifted first user signal. In step 810, repeater 250 frequency shifts the spectrum of the second user signal by a second amount (e.g., a shift amount determined/received in step 804) to produce a shifted second user signal. In step 812, repeater 250 forms a repeater signal comprising the shifted first user signal and the shifted second user signal and transmits the repeater signal. Advantageously, the amount by which the first user signal is shifted does not necessarily have to equal the amount by which the second user signal is shifted. In this way, each user signal in the multi-user signal can be shifted by a different amount.

While various embodiments of the present invention have been described above, it should be understood that they have been presented by way of example only, and not limitation. Thus, the breadth and scope of the present invention should not be limited by any of the above-described exemplary embodiments.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A dynamic frequency translating repeater, said repeater comprising:
   a receiver configured to receive a multi-user signal comprising a first user signal occupying a first spectrum and a second user signal occupying a second spectrum;
   a first frequency shifter dynamically configured to frequency shift the first spectrum by a first amount to produce a shifted first user signal, based on received first user information;
   a second frequency shifter dynamically configured to frequency shift the second spectrum by a second amount to produce a shifted second user signal, based on received second user information, wherein the first amount is not equal to the second amount;
   a signal combiner configured to form a repeater signal comprising the shifted first user signal and the shifted second user signal; and
   a transmitter configured to transmit the repeater signal.

2. The frequency translating repeater of claim 1 wherein the first amount is zero or the second amount is zero.

3. The frequency translating repeater of claim 1, wherein the multi-user signal is a downlink signal or is a superposition of a plurality of uplink signals.

4. The frequency translating repeater of claim 1, wherein the repeater is configured to receive, from one or more of a base station or other node, information specifying the first amount and the second amount.

5. The frequency translating repeater of claim 1, wherein the repeater is further configured to:
   frequency shift a first portion of the first spectrum by a third amount to produce a first shifted first user signal;
   frequency shift a second portion of the first spectrum by a fourth amount to produce a second shifted first user signal; and
   form a repeater signal comprising the first and second shifted first user signals.

6. The frequency translating repeater according to claim 1, wherein the spectrum of the repeater signal overlaps with the spectrum of the multi-user signal.

7. The frequency translating repeater according to claim 1, further comprising:
   a plurality of filters for filtering the multi-user signal to produce a corresponding plurality of signals; and
   a plurality of modulators for modulating each of the corresponding plurality of signals with a complex exponential function of a different frequency.

8. The frequency translating repeater according to claim 7, wherein a scaling factor is associated with at least one of the filters, said scaling factor specifying a power level for the transmission of the corresponding signal in the repeater signal, thereby enabling band-specific power control.

9. The frequency translating repeater according to claim 1, further comprising a band pass filter for isolating the first user signal from the multi-user signal.

10. The frequency translating repeater according to claim 1, wherein the first frequency shifter is further configured to frequency shift the first spectrum by the first amount at a first time to produce a shifted first user signal at a first time and to frequency shift the first spectrum by a fifth amount at a second time to produce a shifted first user signal at a second time, wherein the fifth amount is different than the first amount.

11. A method performed by a repeater in a mobile radio system, said method comprising:
   receiving, at the repeater, a multi-user signal comprising a first user signal having a spectrum and a second user signal having a spectrum;
   frequency shifting at least a portion of the spectrum of the first user signal by a first amount to produce a shifted first user signal, based on received first user information;
   frequency shifting at least a portion of the spectrum of the second user signal by a second amount to produce a shifted second user signal, based on received second user information;
   forming a repeater signal comprising the shifted first user signal and the shifted second user signal; and
   transmitting the repeater signal;
   wherein the first amount is not equal to the second amount.

12. The method according to claim 11 wherein the first amount is zero or the second amount is zero.

13. The method according to claim 11, wherein the multi-user signal is a downlink signal or is a superposition of a plurality of uplink signals.

14. The method according to claim 11, further comprising receiving, from one or more of a base station or other node, information specifying the first amount and the second amount.

15. The method of claim 11, wherein the step of frequency shifting the spectrum of the first user signal comprises:
   frequency shifting a first portion of the spectrum of the first user signal by the first amount to produce a first shifted first user signal; and
   frequency shifting a second portion of the spectrum of the first user signal by a third amount to produce a second shifted first user signal, wherein the third amount does not equal the first amount.

16. The method according to claim 11, wherein the spectrum of the repeater signal overlaps with the spectrum of the multi-user signal.

17. The method according to claim 11, further comprising:
   using a plurality of filters to filter the multi-user signal to produce a corresponding plurality of signals; and
   using a plurality of modulators to modulate each of the corresponding plurality of signals with a complex exponential function of a different frequency.

18. The method according to claim 11, wherein the first user signal is isolated from the multi-user signal by filtering the multi-user signal using a band pass filter.

19. The method according to claim 17, wherein a scaling factor is associated with at least one of the filters, said scaling factor specifying a power level for the transmission of the corresponding signal in the repeater signal, thereby enabling band-specific power control.

20. The method of claim 11, further comprising:
frequency shifting at least a portion of the spectrum of the first user signal by a fifth amount to produce a shifted first user signal at some point in time after frequency shifting at least a portion of the spectrum of the first user signal by the first amount, wherein the fifth amount is different than the first amount.

21. A frequency translating repeater, wherein the repeater is configured to:
receive a multi-user signal comprising a first user signal having a spectrum and a second user signal having a spectrum;
frequency shift the spectrum of the first user signal by a first amount to produce a shifted first user signal, based on received first user information;
frequency shift the spectrum of the second user signal by a second amount to produce a shifted second user signal, based on received second user information;
form a repeater signal comprising the shifted first user signal and the shifted second user signal; and
transmit the repeater signal;
wherein the first amount is not equal to the second amount.

22. The frequency translating repeater of claim 21 wherein the first amount is zero or the second amount is zero.

23. The frequency translating repeater of claim 21, wherein the multi-user signal is a downlink signal or is a superposition of a plurality of uplink signals.

24. The frequency translating repeater of claim 21, wherein the repeater is further configured to receive from one or more of a base station or other node information specifying the first amount and the second amount.

25. The frequency translating repeater of claim 21, wherein the repeater is further configured to:
frequency shift a first portion of the spectrum of the first user signal by a third amount to produce a first shifted first user signal;
frequency shift a second portion of the spectrum of the first user signal by a fourth amount to produce a second shifted first user signal; and
form a repeater signal comprising the first and second shifted first user signals.

26. The frequency translating repeater according to claim 21, wherein the spectrum of the repeater signal overlaps with the spectrum of the multi-user signal.

27. The frequency translating repeater according to claim 21, wherein the repeater comprises:
a plurality of filters for filtering the multi-user signal to produce a corresponding plurality of signals; and
a plurality of modulators for modulating each of the corresponding plurality of signals with a complex exponential function of a different frequency.

28. The frequency translating repeater according to claim 21, wherein the repeater comprises a first band pass filter for isolating the first user signal from the multi-user signal and a second band pass filter for isolating the second user signal from the multi-user signal.

29. The frequency translating repeater according to claim 27, wherein a scaling factor is associated with at least one of the filters, said scaling factor specifying a power level for the transmission of the first user signal in the repeater signal, thereby enabling band-specific power control.

30. The frequency translating repeater according to claim 21, wherein the frequency translating repeater is configured to be controlled by a base station.

31. The frequency translating repeater according to claim 30, wherein the frequency translating repeater is configured to receive from the base station a control message setting the first amount and the second amount.

* * * * *

UNITED STATES PATENT AND TRADEMARK OFFICE
CERTIFICATE OF CORRECTION

PATENT NO. : 8,750,789 B2
APPLICATION NO. : 13/143522
DATED : June 10, 2014
INVENTOR(S) : Baldemair et al.

Page 1 of 1

It is certified that error appears in the above-identified patent and that said Letters Patent is hereby corrected as shown below:

On the Title Page, item (75), under "Inventors", in Column 1, Line 1, delete "Päl" and insert -- Pål --, therefor.

In the Specification

In Column 2, Line 28, delete "$time_d$," and insert -- $time_0$, --, therefor.

In Column 2, Line 33, delete "$time_d$." and insert -- $time_0$. --, therefor.

Signed and Sealed this
Sixteenth Day of September, 2014

Michelle K. Lee
*Deputy Director of the United States Patent and Trademark Office*